(12) United States Patent
James-Roxby et al.

(10) Patent No.: US 6,621,295 B1
(45) Date of Patent: Sep. 16, 2003

(54) RECONFIGURABLE PRIORITY ENCODING

(75) Inventors: Philip B. James-Roxby, Longmont, CO (US); Daniel J. Downs, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/047,667

(22) Filed: Jan. 15, 2002

(51) Int. Cl.[7] .......................... G06F 7/38; H03K 19/173
(52) U.S. Cl. ........................... 326/38; 326/105
(58) Field of Search ............................ 326/37, 38, 39, 326/40, 41, 105; 341/50; 714/724, 725; 711/108, 158

(56) References Cited

U.S. PATENT DOCUMENTS

| | | | | |
|---|---|---|---|---|
| 4,831,573 A | * | 5/1989 | Norman | 364/716 |
| 6,081,914 A | * | 6/2000 | Chaudhary | 714/724 |
| 6,329,838 B1 | * | 12/2001 | Hayakawa | 326/38 |

OTHER PUBLICATIONS

Gordon Brebner and Adam Donlin; "Runtime Reconfigurable Routing"; published in 5th Reconfigurable Architectures Workshop; Orlando, Florida; Mar. 30, 1998; pp. 1–10.

Eric Keller; "JRoute: A Run–Time Routing API for FPGA Hardware"; published in 7th Reconfigurable Archietectures Workshop; Cancun, Mexico, May 1, 2000; pp. 1–8.

* cited by examiner

*Primary Examiner*—Daniel Chang
(74) *Attorney, Agent, or Firm*—LeRoy D. Maunu; Lois D. Cartier

(57) ABSTRACT

A reconfigurable priority encoding arrangement and method. In various embodiments, the invention identifies, from a plurality of input signals, a highest priority signal that is in a selected state. A priority routing block is implemented on a programmable logic device (PLD). The routing block has a plurality of input ports arranged to receive the respective input signals and a plurality of output ports respectively coupled to the input ports. A priority encoder is also implemented on the PLD and has input ports respectively coupled to the output ports of the priority routing block. Each input port has a priority relative to others of the input ports. The priority encoder is configured to generate an address signal that identifies the input signal having a highest priority and that is in the selected state.

13 Claims, 6 Drawing Sheets

RECONFIGURABLE PRIORITY ENCODING

GOVERNMENT CONTRACT

The U.S. Government has a paid-up license in this invention and the right in limited circumstances to require the patent owner to license others on reasonable terms as provided for by the terms of DABT63-99-3-0004 awarded by DARPA.

FIELD OF THE INVENTION

The present invention generally relates to priority encoders, and more particularly to a reconfigurable priority encoder.

BACKGROUND

Some content addressable memory (CAM) arrangements include a "priority encoder" circuit. The priority encoder circuit determines, for input data that match multiple entries in the CAM, which entry has the highest priority. The priority of entries in the CAM is generally predefined by the system designer.

Priority encoders generally implement the priority either implicitly or explicitly. Implicit priority uses the physical locations of CAM entries to denote priority. For example, the entry at address 0 has higher priority than the entry at address 1, the entry at address 1 has higher priority than the entry at address 2, and so on. Explicit priority involves codes that are associated with the CAM entries to designate the relative priorities.

Because implicit priority relies on the physical position to denote priority, determining which of multiple matching entries is the highest priority is fast and requires minimal logic. However, adding a new CAM entry involves finding an insertion point in the CAM for the new entry and shifting all lower priority entries to make room for the new entry.

Because explicit priority relies on associated codes to designate priority, new entries can be easily added to the CAM. However, determining which of multiple matching entries is the highest priority is more complex and slower in an explicit priority arrangement than in an implicit priority arrangement. The explicit priority arrangement must sort matching entries, which adds logic and introduces latency.

A system and method that address the aforementioned problems, as well as other related problems, are therefore desirable.

SUMMARY OF THE INVENTION

The invention provides a reconfigurable priority encoding for identifying, from a plurality of input signals, a highest priority signal that is in a selected state. A priority routing block is implemented on a programmable logic device (PLD). The routing block has a plurality of input ports arranged to receive the respective input signals and a plurality of output ports respectively coupled to the input ports. A priority encoder is also implemented on the PLD and has input ports respectively coupled to the output ports of the priority routing block. Each input port has a priority relative to others of the input ports. The priority encoder is configured to generate an address signal that identifies the input signal having a highest priority and that is in the selected state.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

The present invention is directed to a priority encoder circuit arrangement that is run-time reconfigurable. In one embodiment, the priority encoder circuitry is implemented in a programmable logic device (PLD), and run-time reconfiguration control logic defines the relative priorities of signals and controls configuration and reconfiguration of the PLD according to application requirements.

Figure 1:
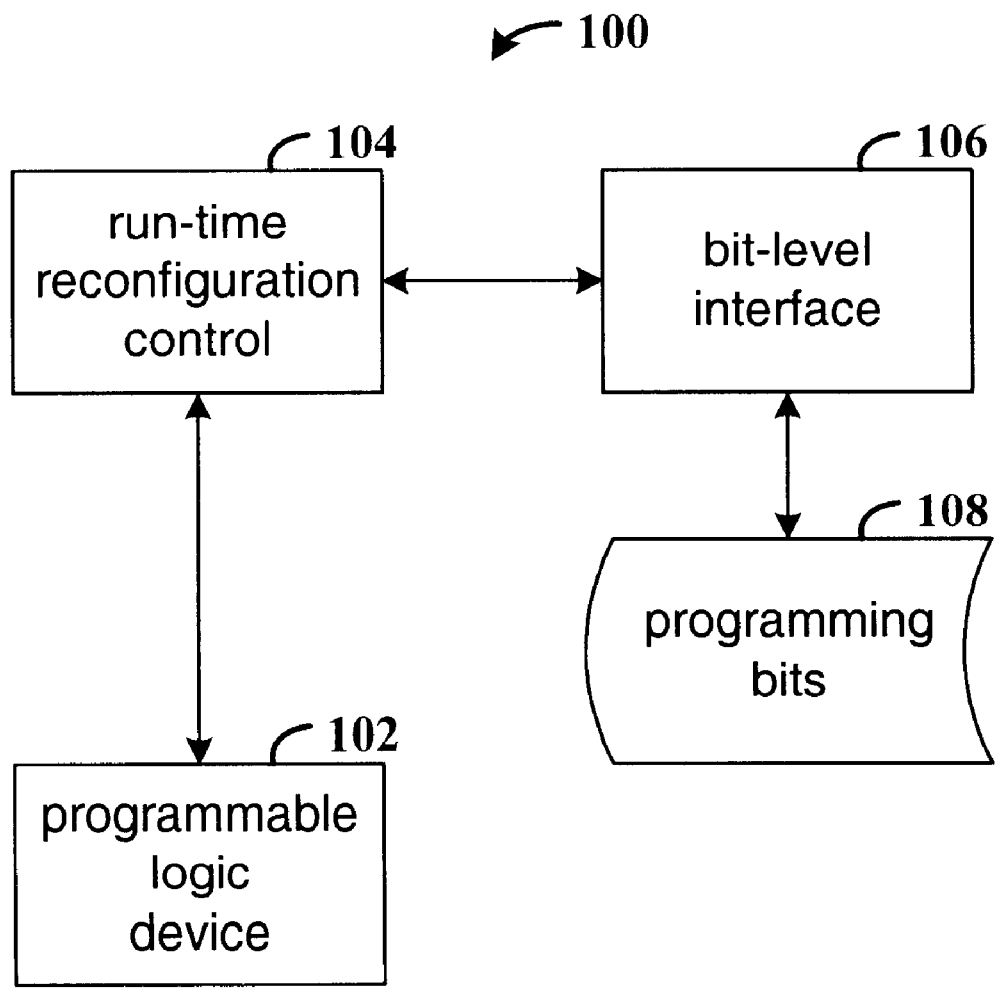
FIG. 1 is a functional block diagram of an arrangement that supports run-time reconfiguration of a programmable logic device.

FIG. 1 is a functional block diagram of an arrangement 100 that supports run-time reconfiguration of a programmable logic device 102. Arrangement 100 includes run-time reconfiguration control element 104 that controls overall configuration and reconfiguration of PLD 102. In an example embodiment, control element includes a computing arrangement that hosts a run-time reconfiguration program written in the Java® language. A hardware interface (not shown) provides a portable layer of software and accompanying hardware that couples run-time reconfiguration control element 104 to PLD 102. An example hardware interface is the Xilinx Hardware Interface (XHWIF), which is available from Xilinx.

The application functions of run-time reconfiguration control element 104 depend on a user's system requirements. For example, in addition to configuration and/or run-time reconfiguration of programmable logic device 102, the user application program 104 can be programmed to provide user-interface functions and/or digital signal processing.

The run-time reconfiguration control element 104 also includes a core library (not shown) in another embodiment. The core library is a collection of macrocell or "core" generators that are implemented as Java classes. The cores are generally parameterizable and relocatable within a device. Examples of cores include the priority encoder logic of the present invention, counters, adders, multipliers, constant adders, constant multipliers, flip-flops and other standard logic and computation functions. It will be appreciated that the run-time reconfiguration control element includes any device or system capable of run-time reconfigurations to the PLD.

Bit-level interface 106 includes an application program interface that allows a user application program (in run-time reconfiguration control 104) to manipulate configurable resources of the PLD 102. JBits software from Xilinx provides an environment for designing and deploying applications that support run-time reconfiguration, as well as functions of the bit-level interface 106. The bit-level interface also includes a set of functions, one or more of which are invoked when the user application program references the application program interface. The set of functions in the bit-level interface manipulate selected ones of programming bits 108, based on the type of programmable logic device. For example, some of the functions in the set may be programmed for certain devices in the Virtex™ family of FPGAs from Xilinx, and others of the functions may programmed for other devices in the 4000 series devices.

Figure 2:
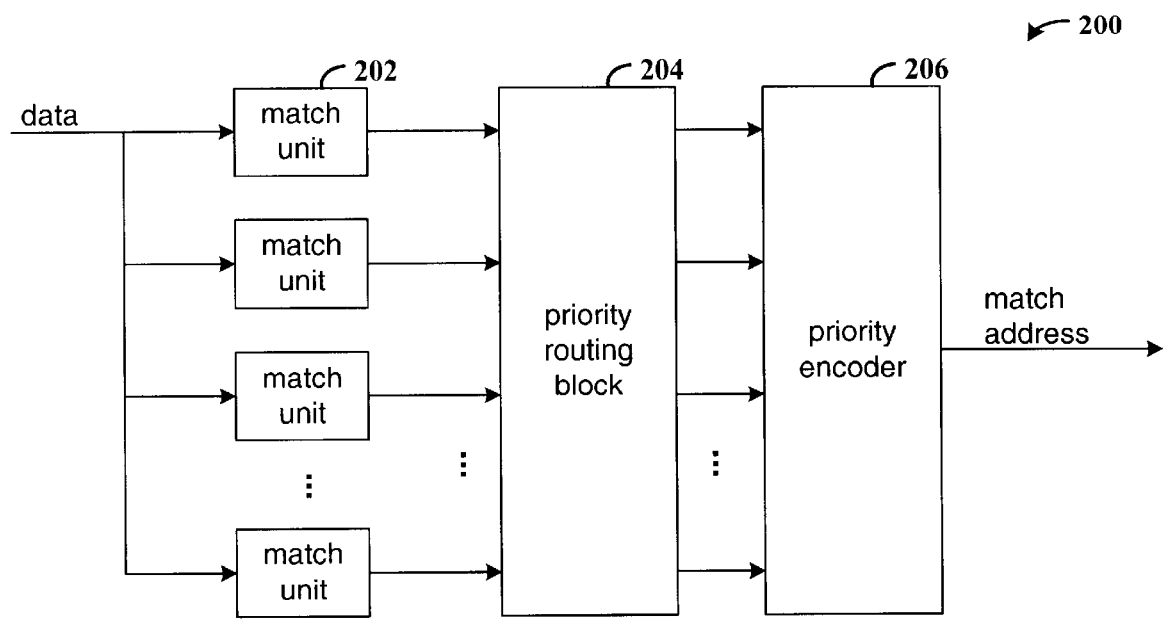
FIG. 2 is a functional block diagram of a circuit arrangement for matching input data to selected patterns and prioritizing matches in accordance with one embodiment of the invention.

FIG. 2 is a functional block diagram of a circuit arrangement 200 for matching input data to selected patterns and prioritizing matches in accordance with one embodiment of the invention. In one embodiment, arrangement 200 is implemented on a PLD and is run-time reconfigurable. Run-time reconfigurability allows the relative priorities of the matching input data to be changed by a run-time reconfiguration control logic such as that described above in association with FIG. 1.

Arrangement 200 includes a plurality of match units implemented on the programmable logic device. Each match unit is configured to generate a hit signal, the state of which indicates whether the input data matches an associated one of the patterns. In one embodiment, each match unit is implemented with one or more PLD look-up tables (LUTs) which are addressed by the pattern to match and configured with a bit value(s) that indicates a hit(s). In another embodiment, the match units may be content addressable memory units or any device capable of indicating a match or other significant condition by raising a single bit hit line. In addition, the data input to the match units need not be the same data as shown in arrangement 200.

Priority routing block 204 includes a plurality of input ports and output ports where the connections between the input ports and output ports are run-time reconfigurable. The priority encoder is coupled to the priority routing block and is configured to generate an address signal that identifies the match unit generating a hit signal and having the highest priority. The relative priority of signals input to the priority encoder is determined by the relative position of the priority encoder input ports. The relative priority of the match units is run-time reconfigurable by virtue of the run-time reconfigurable connections between the input ports and output ports of the priority routing block.

In one embodiment, arrangement 200 assumes a fixed maximum number of match units and corresponding number of input and output ports in the priority routing block and priority encoder. The initial PLD configuration has connections from the output ports of the match units to respective input ports of the priority routing block and from output ports of the priority routing block to respective input ports of the priority encoder. The relative position of the priority encoder input ports determine the relative priority.

Depending on application requirements, not all of the match units need be used. For unused match units, the priority routing block is configured to output a constant logic level 0 on the associated output port instead of connecting the input port assigned to the match unit to the output port.

Figure 3:
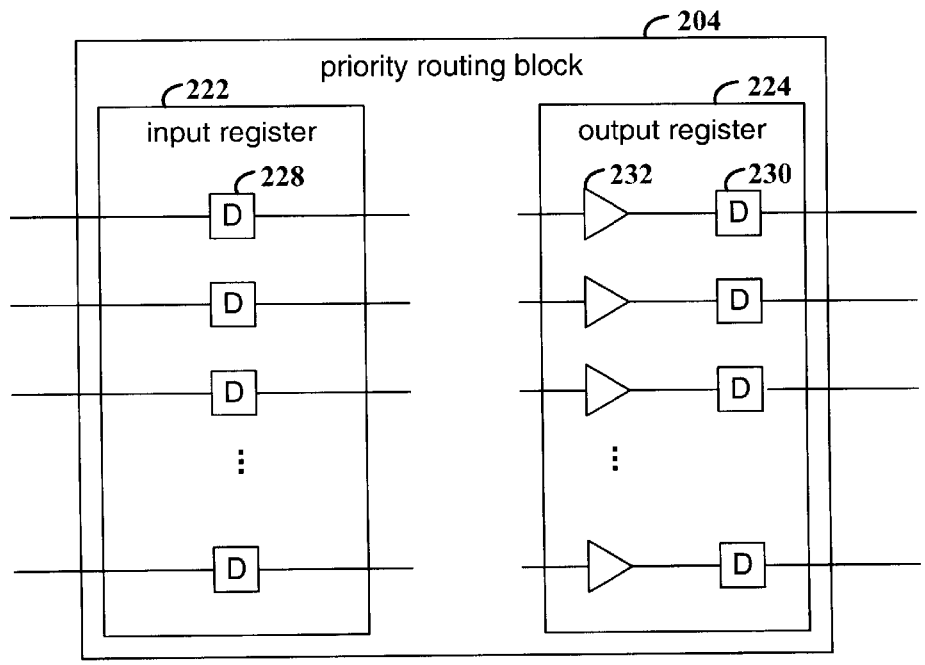
FIG. 3 is a functional block diagram of an example priority routing block with run-time reconfigurable connections between input ports and output ports.

FIG. 3 is a functional block diagram of an example priority routing block 204 with run-time reconfigurable connections between input ports and outputs ports. The priority routing block includes input register 222 and output register 224. The input register implements the input ports of the priority routing block and includes a plurality of D flip-flops, for example flip-flop 228. Similarly, the output register is implemented with a plurality of D flip-flops, for example, flip-flop 230, that drive the output ports of the priority routing block.

Each flip-flop in the output register is driven by an associated configurable buffer. For example, flip-flop 230 is driven by buffer 232. The buffer is configurable to drive a constant logic level 0 ("zero generator") or drive the signal provided by the connected one of the flip-flops in the input register 222. The zero generator configuration is used to avoid errant results from the priority encoder, both while the circuit is operational and during run-time reconfiguration. An output port of the priority routing block is disabled by configuring the associated buffer as a zero generator. This causes the output signal from that output port to be logic level 0, regardless of the input signal from the input register.

Figure 4:
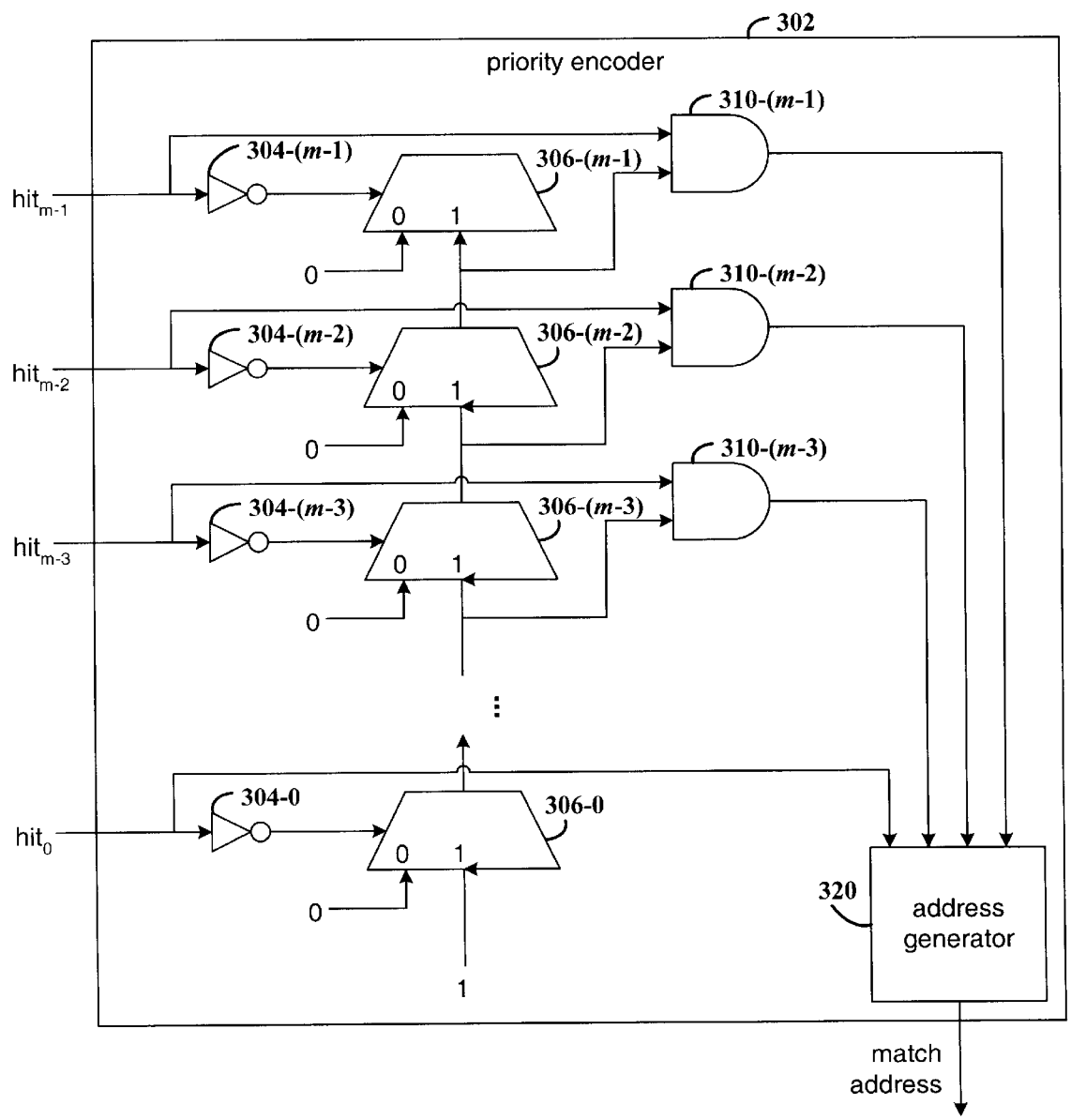
FIG. 4 is a functional block diagram of a priority encoder in accordance with an example embodiment of the invention.

FIG. 4 is a functional block diagram of a priority encoder in accordance with an example embodiment of the invention. Priority encoder 302 generates a match address that identifies the input hit signal that is active and that has the highest relative priority. The priority encoder first resolves the one or more active hit signals at m input ports into a single active hit signal of m output signals, with the single active signal corresponding to the input port with the highest priority. The priority encoder then generates an address from the single active hit signal of the m signals.

Hit signals are presented to the encoder on an m-line bus with the highest priority hit-signal present at bus line 0, and the signals at bus lines 1 through m−1 having decreasing priority, with the lowest priority hit signal at the bus line m−1. The input hit signals are presented at inverters 304-0–304-(m−1), which provide the selector signals to the multiplexers 306-0–306-(m−1). The multiplexers form a carry chain in which one of the input signals is a constant logic level 0, and the other input signal is the output signal from the multiplexer in the previous stage in the carry chain. The carry chain produces a "mask" in which the lowest order bits (highest priority) are logic level 1, up to and including the first active hit signal, and the remaining bits are logic level 0.

The input signal, $hit_0$, on the lowest order bus line is input directly to address generator 320. For the other bus lines (signals $hit_1 \ldots hit_{m-1}$), the signals are input to corresponding AND gates 310-1–310-(m−1), along with the output signals from the previous stages in the carry chain. For example, the input signal $hit_{m-2}$ and the output signal from multiplexer 306-(m−3) are input to AND gate 310-(m−2).

Only one of the signals input to the address generator 320 is a logic level 1. The input signal to address generator that is logic level 1 is the signal of the lowest order signal (highest priority) that is logic level 1. Logic level zeros are produced for all the other input hit signals.

Address generator 320 generates a match address in response to the signals from the output ports of the AND gates 310-1–310-(m−1). An example address generator is a logic network of "OR" gates that produces a set of binary signals which, taken in the aggregate, uniquely identifies the one active hit address, for example a set of five binary weighted signals representing the address of the active hit line.

Figure 5:
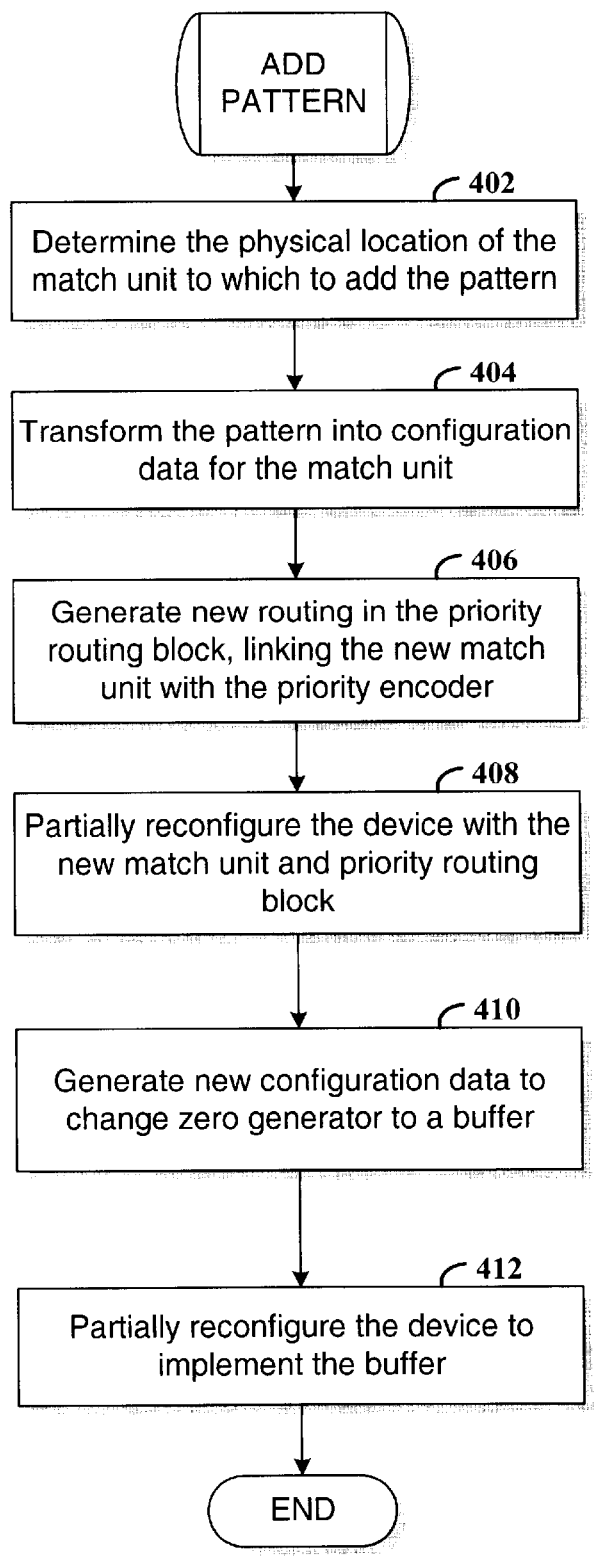
FIG. 5 is a flowchart of an example process for adding a pattern of selected priority to the circuitry for matching patterns and prioritizing matches.

FIG. 5 is a flowchart of an example process to add a pattern of selected priority to the circuitry for matching patterns and prioritizing matches. For devices that are partially reconfigurable, part of the device may remain operational while another part of the device is undergoing reconfiguration. Therefore, while a pattern is being added it is important that the device not enter an unstable state. The process is generally controlled by run-time reconfiguration control 104.

The first step (402) is to determine the physical location on the device of the match unit that will be used to match the new pattern. In an example embodiment, the run-time reconfiguration control maintains an array of flags that indicate match units that are instantiated at particular locations, and the new pattern is added into the first available location.

The pattern is then transformed into configuration data to configure a match unit (step 404) on the device. The configuration data is stored as programming bits 108, for example. The new match unit must then be connected to the priority encoder 206. The connection is via the priority routing block 204. Using the JBits routing functions, for example, configuration data is generated (step 406) to connect the routing block input port for the new match unit to a selected routing block output port based on the selected priority of the match unit. The device is then partially reconfigured with the new match unit and routing block (step 408).

The last stage in adding a new pattern is to reconfigure the buffer that drives the flip-flop in the output register from a zero generator to a true buffer. First, new configuration data is generated for the buffer (step 410), and then the PLD is partially reconfigured (step 412).

Even though the example process to add a pattern is described in terms of adding a pattern without having to change the priority of other patterns, those skilled in the art will appreciate that the methods for adding, removing (FIG. 6), and changing a pattern's priority (FIG. 7) are suitable in various adaptations for adding a pattern with a priority that is between already-configured pattern priorities.

It will be appreciated that the runtime reconfiguration control allows portions of the PLD that are unaffected by the partial reconfiguration to continue operating while the new pattern is added.

Figure 6:
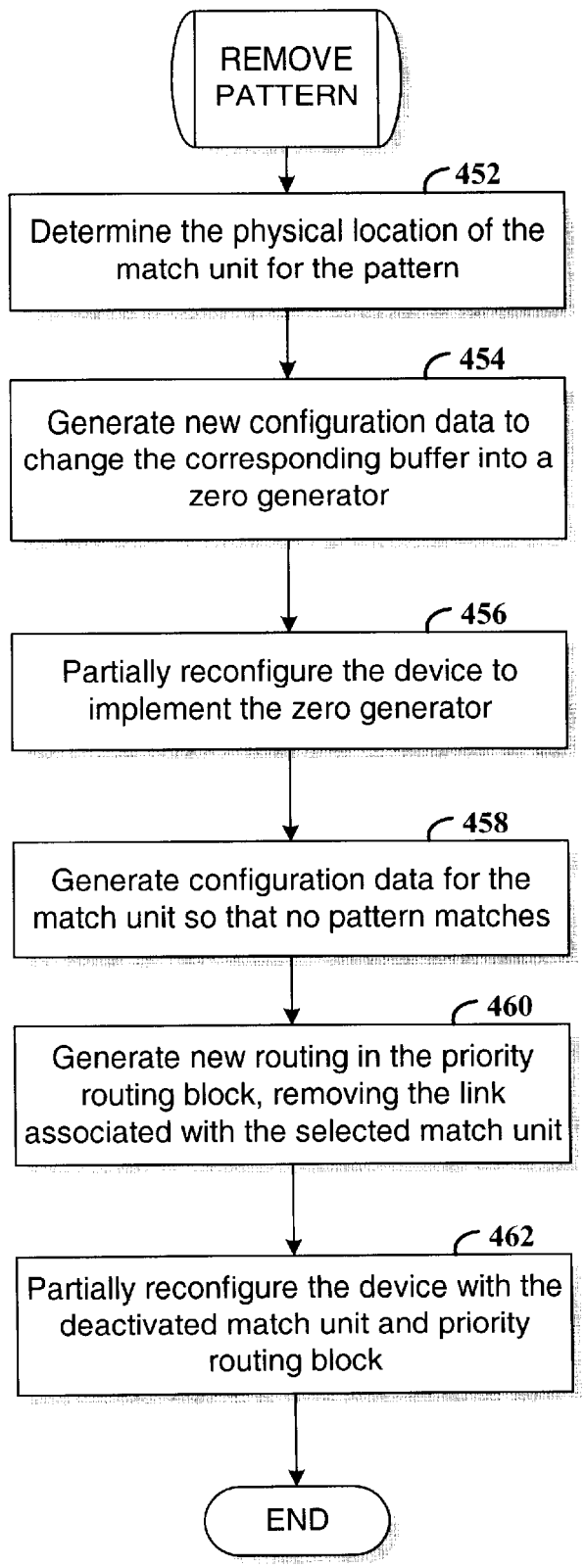
FIG. 6 is a flowchart of an example process for removing a pattern against which input data is matched.

FIG. 6 is a flowchart of an example process for removing a pattern against which input data is matched. First, the process determines which of the match units is configured to detect the pattern to be removed (step 452). In an example embodiment, the run-time reconfiguration control component 104 maintains a table that indicates the patterns and corresponding match units that detect the patterns.

New configuration data is then generated (step 454) to configure as a zero generator the buffer (in the output register 224) that is connected to the match unit. The priority of the pattern identifies the connected buffer. The priority is stored in the table of patterns and corresponding match units as maintained by the run-time reconfiguration control component 104. The device is then partially reconfigured, thereby configuring the buffer as a zero generator. Thus, regardless of whether subsequent data is detected as a pattern match by the match unit, the output signal at the output register is always zero.

In one embodiment, configuration data is then generated to configure the match unit so that no input data results in a pattern match (step 458). For example, in the above-described LUT implementation, configuration data is generated in which the lowest order LUT outputs logic level 0 for all input addresses. This ensures that the logical ANDing of the output signals from the lowest LUT with any other LUTs that are used to define the pattern always results in logic level 0. In another embodiment, the match unit is not reconfigured since the buffer is already configured as a zero generator.

Configuration data is also generated to disconnect in the priority routing block the input port connected to the match unit from the connected output port (step 460). The device is then partially reconfigured (step 462), whereby the match unit is no longer configured to detect the pattern, and the priority routing block having an available output port.

Figure 7:
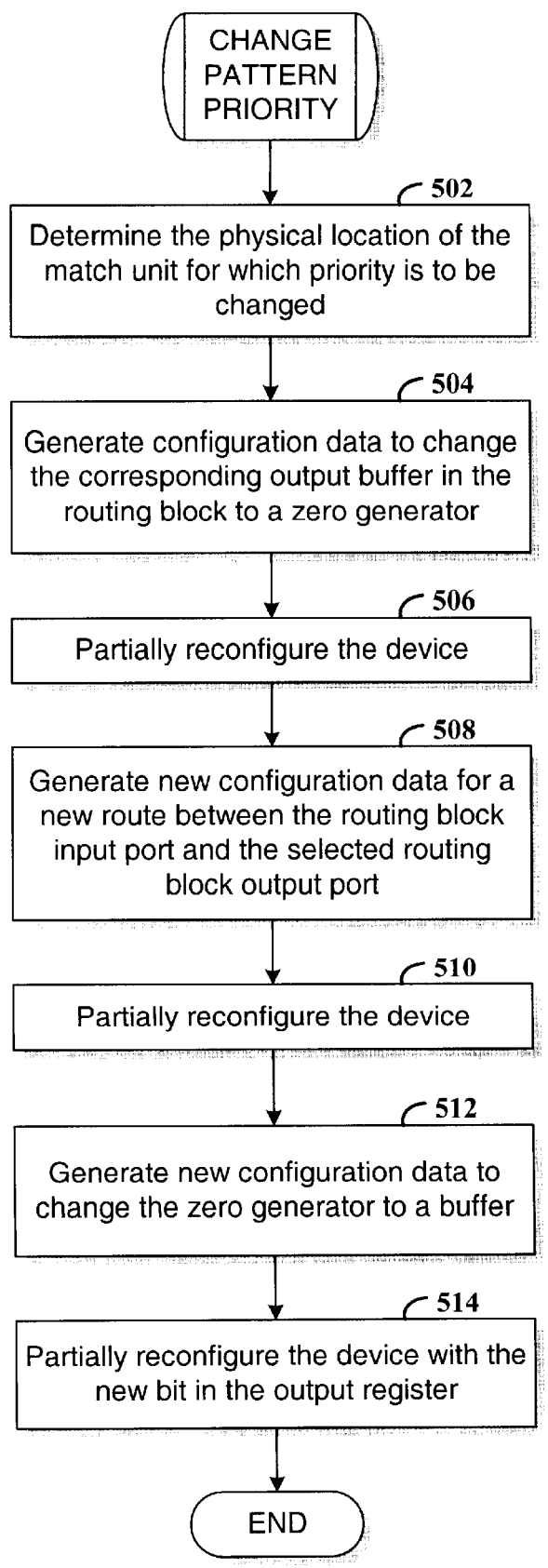
FIG. 7 is a flowchart of an example process to change the relative priority of a pattern.

FIG. 7 is a flowchart of an example process to change the relative priority of a pattern. The process is described in terms of changing the priority of a single pattern. However, it will be appreciated that the illustrated process could be adapted to change the priorities of multiple patterns if required by an application. Generally, changing the priority of a pattern involves removing the current connection from the match unit to the priority encoder and reconnecting the match unit to a different port of the priority encoder.

First, the physical location of the match unit for which the priority is to change is determined (step 502). Then configuration data is generated to configure as a zero generator the current output buffer in the routing block that is connected to the match unit (step 504). The device is then partially reconfigured (step 506), following which the logic level 0 is always provided to the connected port of the priority encoder.

Based on an application-identified priority, a port in the output register of the routing block is selected for the match unit, and new configuration data is generated to connect the routing block input port (for the match unit) to the selected port (step 508). It will be appreciated that the example process assumes that the selected output port is available. The device is then partially reconfigured (step 510).

The last phase is to reconfigure the selected output port from being a zero generator to allowing the hit signal from the match unit to pass. New configuration data is generated for the buffer of the selected output port (step 512), and the device is then partially reconfigured (step 514), which completes the process.

What is claimed is:

1. A priority encoding arrangement for identifying a highest priority signal in a selected state from a plurality of input signals, comprising:

a priority routing block implemented on a programmable logic device (PLD), the priority routing block having a plurality of input ports arranged to receive the respective input signals and a plurality of output ports respectively coupled to the input ports; and a priority encoder implemented on the PLD and having input ports respectively coupled to the output ports of the priority routing block, wherein each input port has a priority relative to others of the input ports, the priority encoder configured to generate an address signal that identifies the input signal having a highest priority and that is in the selected state, wherein the PLD is configured with a current configuration bitstream and further comprising a run-time reconfiguration control arrangement coupled to the programmable logic device, the run-time reconfiguration control arrangement configured to generate from the current configuration bitstream a new configuration bitstream that changes one or more selected couplings of routing block input ports to routing block output ports and reconfigure the PLD with the new configuration bitstream.

2. The priority encoding arrangement of claim 1, wherein the run-time reconfiguration control arrangement is further configured to partially reconfigure the PLD with the new configuration bitstream without disabling during reconfiguration ports of the priority routing block and priority encoder that are not affected by the new configuration bitstream.

3. The priority encoding arrangement of claim 1, further comprising a plurality of match units respectively coupled to the input ports of the routing block, each match unit configured to generate a hit signal in response to a match between an input data set and a configured data set.

4. The priority encoding arrangement of claim 3, wherein the run-time reconfiguration control arrangement is further configured to generate a configuration bitstream that implements an additional match unit and connects the additional match unit to the routing block.

5. The priority encoding arrangement of claim 3, wherein the run-time reconfiguration control arrangement is further configured to generate a configuration bitstream that disconnects a selected match unit from the routing block.

6. The priority encoding arrangement of claim 3, wherein the run-time reconfiguration control arrangement is further configured to generate a configuration bitstream that changes a priority associated with a match unit by reassignment of input ports to output ports in the routing block.

7. A method for run-time reconfigurable identification of a highest priority signal in a selected state from a plurality of input signals, comprising:

configuring a programmable logic device (PLD) with a current configuration bitstream that implements, a priority routing block having input ports arranged to receive the respective input signals and a plurality of output ports respectively coupled to the input ports; and a priority encoder having input ports respectively coupled to the output ports of the priority routing block, wherein each input port has a priority relative to others of the input ports and the priority encoder is configured to generate an address signal that identifies the input signal of a highest priority and that is in the selected state;

generating from the current configuration bitstream a new configuration bitstream that changes one or more selected couplings of routing block input ports to routing block output ports; and reconfiguring the PLD with the new configuration bitstream.

8. The method of claim 7, further comprising partially reconfiguring the PLD with the new configuration bitstream.

9. The method of claim 7, wherein the current configuration bitstream implements a plurality of match units respectively coupled to the input ports of the routing block, each match unit configured to generate a hit signal in response to a match between an input data set and a configured data set.

10. The method of claim 9, further comprising generating in the new configuration bitstream configuration data that implement an additional match unit and connect the additional match unit to the routing block.

11. The method of claim 9, further comprising generating in the new configuration bitstream configuration data that disconnect a selected match unit from the routing block.

12. The method of claim 9, generating in the new configuration bitstream configuration data that change a priority associated with a match unit by reassignment of input ports to output ports in the routing block.

13. An apparatus for run-time reconfigurable identification of a highest priority signal in a selected state from a plurality of input signals, comprising:

means for configuring a programmable logic device (PLD) with a current configuration bitstream that implements a priority routing block having input ports arranged to receive the respective input signals and a plurality of output ports respectively coupled to the input ports, the current configuration bitstream further implementing a priority encoder having input ports respectively coupled to the output ports of the priority routing block, wherein each input port has a priority relative to others of the input ports and the priority encoder is configured to generate an address signal that identifies the input signal of a highest priority and that is in the selected state;

means for generating from the current configuration bitstream a new configuration bitstream that changes one or more selected couplings of routing block input ports to routing block output ports; and means for reconfiguring the PLD with the new configuration bitstream.

* * * * *